United States Patent

Moon

(10) Patent No.: US 9,924,096 B2
(45) Date of Patent: Mar. 20, 2018

(54) HALL SENSOR DEVICE AND OPTICAL IMAGE STABILIZATION DEVICE

(71) Applicant: Samsung Electro-Mechanics Co., Ltd., Suwon-si (KR)

(72) Inventor: Yo Sub Moon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 114 days.

(21) Appl. No.: 14/961,214

(22) Filed: Dec. 7, 2015

(65) Prior Publication Data

US 2016/0182827 A1 Jun. 23, 2016

(30) Foreign Application Priority Data

Dec. 23, 2014 (KR) .................. 10-2014-0186908

(51) Int. Cl.
*H04N 5/228* (2006.01)
*H04N 5/232* (2006.01)
*G02B 27/64* (2006.01)
*G03B 17/00* (2006.01)
*H04N 5/225* (2006.01)

(52) U.S. Cl.
CPC ....... *H04N 5/23248* (2013.01); *G02B 27/646* (2013.01); *G03B 17/00* (2013.01); *G03B 2205/0007* (2013.01); *G03B 2217/005* (2013.01); *H04N 5/2257* (2013.01); *H04N 5/23258* (2013.01); *H04N 5/23287* (2013.01)

(58) Field of Classification Search
CPC ... H04N 5/23248; G02B 27/646; G01R 33/07
USPC ................. 348/208.11, 208.13, 219.1; 330/9
See application file for complete search history.

(56) References Cited

U.S. PATENT DOCUMENTS

| 2003/0102909 A1* | 6/2003 | Motz ................. G01R 33/07 330/9 |
| 2007/0065126 A1 | 3/2007 | Hatanaka et al. |
| 2009/0012733 A1 | 1/2009 | Yamada et al. |
| 2011/0228113 A1* | 9/2011 | Chen ................. G02B 27/646 348/208.5 |
| 2012/0163784 A1* | 6/2012 | Saito ................. G02B 27/646 396/55 |
| 2012/0262163 A1 | 10/2012 | Han et al. |
| 2012/0319609 A1 | 12/2012 | Choi et al. |
| 2014/0145714 A1* | 5/2014 | Okatake ................. G01R 33/07 324/225 |

(Continued)

FOREIGN PATENT DOCUMENTS

| JP | 7-218563 A | 8/1995 |
| JP | 2007-88829 A | 4/2007 |

(Continued)

OTHER PUBLICATIONS

Korean Office Action dated Feb. 19, 2016, in counterpart Korean Application No. 10-2014-0186908 (8 pages in English, 6 pages in Korean).

*Primary Examiner* — Sinh Tran
*Assistant Examiner* — Zhenzhen Wu
(74) *Attorney, Agent, or Firm* — NSIP Law

(57) ABSTRACT

A hall sensor device includes: an amplifier configured to amplify a detection signal of a hall sensor; and a current supplier configured to provide a compensation current to a feedback line of the amplifier according to an offset of the detection signal, to cancel the offset.

10 Claims, 5 Drawing Sheets

(56) References Cited

U.S. PATENT DOCUMENTS

2016/0327806 A1* 11/2016 Kasamatsu .......... G02B 27/646

FOREIGN PATENT DOCUMENTS

| JP | 2007-271599 A | 10/2007 |
|---|---|---|
| KR | 10-2011-0055992 A | 5/2011 |
| KR | 10-2012-0116036 A | 10/2012 |
| KR | 10-2012-0138876 A | 12/2012 |

* cited by examiner

| | RELATED ART | DISCLOSED EMBODIMENT |
|---|---|---|
| OFFSET RANGE | NARROW | WIDE |
| NOISE | HIGH | LOW |

HALL SENSOR DEVICE AND OPTICAL IMAGE STABILIZATION DEVICE

CROSS-REFERENCE TO RELATED APPLICATION(S)

This application claims the benefit of Korean Patent Application No. 10-2014-0186908 filed on Dec. 23, 2014 in the Korean Intellectual Property Office, the entire disclosure of which is incorporated herein by reference for all purposes.

BACKGROUND

1. Field

The following description relates to a hall sensor device and an optical image stabilization device operable to cancel a direct current (DC) offset.

2. Description of Related Art

Recently-released mobile devices have been equipped with camera modules, and as levels of performance of mobile devices have increased, mobile devices in which high performance camera modules, having levels of resolution from millions of pixels to tens of millions of pixels or more, are mounted, have been released onto the market. However, even though high-pixel camera modules are required in mobile devices, an amount of space available for camera modules is inevitably limited, due to inherent limitations of available space within mobile devices. As a result, a small lens aperture, a small image pixel size, and the like, in addition to factors such as subtle motion due to external vibrations, hand-shake, and the like, may contribute to image deterioration when an image is captured.

In order to suppress image deterioration caused by the above-mentioned subtle vibrations and obtain a clearer image, various image correction methods have been developed. For example, a method employing an optical image stabilization (OIS) device to provide an optical hand-shake correction function has been developed. The OIS device may use a hall sensor to detect positions of a lens on an X axis and a Y axis, and may calculate a hand-shake component detected by a gyro sensor and position information of the lens on the X axis and the Y axis to drive the positioning of the lens.

In general, user hand-shake is generated in a frequency range from less than 1 Hz to a few tens of Hz. As a result, as described in Japanese Patent Laid-Open Publication No. 2007-88829, the detection signal from the gyro sensor is quantized prior to passing through a high pass filter (HPF), and thus the DC offset, drift components, and the like, included in the detection signal, may be canceled.

However, the hand-shake frequency between 1 Hz and a few tens of Hz may be included in an output signal of the hall sensor and a frequency or a level of the output signal of the hall sensor may be low. Therefore, a direct current (DC) offset may occur when the output signal is amplified, thereby causing malfunctioning of the OIS device.

In addition, in a case in which the optical image stabilization device is operated with a low noise level at the time of canceling the DC offset, the optical image stabilization device may correctly perform the hand-shake correction function.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one general aspect, a hall sensor device includes: an amplifier configured to amplify a detection signal of a hall sensor; and a current supplier configured to provide a compensation current to a feedback line of the amplifier according to an offset of the detection signal, to cancel the offset.

The amplifier my include a first amplifier configured to amplify a first detection signal from the hall sensor and a second amplifier configured to amplify a second detection signal from the hall sensor. Each of the first and second amplifiers may be configured to receive the compensation current from the current supplier through the feedback line.

The hall sensor device may further include a buffer configured to buffer output signals of the first and second amplifiers.

The feedback line includes a first feedback line to the first amplifier and a second feedback line to the second amplifier. The current supplier may be configured to provide the compensation current to the first feedback line and the second feedback line, respectively, according to a difference in voltage levels between the first detection signal and the second detection signal.

The current supplier may include: a current source; a first switch group including first switches configured to provide a first current transfer path from the current source; a first transistor group including first transistors connected to the first switches, respectively, each of the first transistors being configured to amplify a current from a corresponding switch among the first switches; a second switch group including second switches providing a second current transfer path from the current source; a second transistor group including second transistors connected to the second switches, respectively, each of the second transistors being configured to amplify a current from a corresponding switch among the second switches; and a current mirror configured to mirror the amplified currents from the first transistor group and the second transistor group to output a first compensation current and a second compensation current.

The first compensation current and the second compensation current may have a compensation relationship.

The feedback line may include a first feedback line to the first amplifier and a second feedback line to the second amplifier. The first compensation current may be applied to the first feedback line. The second compensation current may be applied to the second feedback line.

Amplification ratios of the first amplifier and the second amplifier may be set depending on resistance ratios of resistors of the first and second feedback lines.

According to another general aspect, an optical image stabilization device includes: a first signal processor configured to cancel an offset included in a detection signal from a hall sensor by providing a compensation current to a feedback line of an amplifier; and a controller configured to control a position of an imager according to a signal processing result of the first signal processor.

The first signal processor may include: an amplifier including a first amplifier configured to amplify a first detection signal from the hall sensor and a second amplifier configured to amplify a second detection signal from the hall sensor; and a current supplier configured to apply a first compensation current to a feedback line of the first amplifier and apply a second compensation current to a feedback line of the second amplifier, wherein each of the first and second amplifiers includes: a differential amplifier configured to receive the compensation current of the current supplier according to a difference in voltage levels between the first detection signal and the second detection signal through the feedback line; and a buffer configured to buffer output signals of the first and second amplifiers.

The current supplier may include: a current source; a first switch group including first switches configured to provide a first current transfer path from the current source; a first transistor group including first transistors connected to the first switches, respectively, each of the first transistors being configured to amplify a current from a corresponding switch among the first switches; a second switch group including second switches configured to provide a second current transfer path from the current source; a second transistor group including second transistors connected to the second switches, respectively, each of the second transistors being configured to amplify a current from a corresponding switch among the second switches; and a current mirror configured to mirror the amplified currents from the first transistor group and the second transistor group to output the first compensation current and the second compensation current.

The first compensation current and the second compensation current may have a compensation relationship.

Amplification ratios of the first amplifier and the second amplifier may be set depending on resistance ratios of resistors of the feedback line of the first amplifier and the feedback line of the second amplifier.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
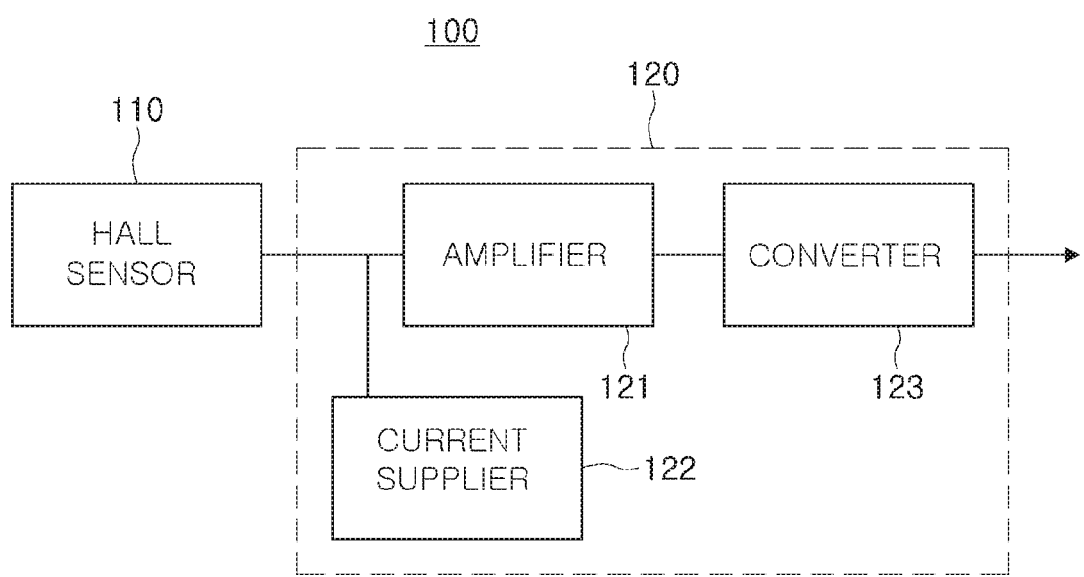
FIG. 1 is a schematic block diagram of a hall sensor device according to an example embodiment.

FIG. 1 is a schematic block diagram of a hall sensor device 100 according to an example embodiment.

Referring to FIG. 1, the hall sensor device 100 includes a first signal processor 120 configured to perform signal processing on a detection signal from a hall sensor 110. The first signal processor 120 includes an amplifier 121, a current supplier 122, and a converter 123.

The amplifier 121 is configured to amplify a level of the detection signal from the hall sensor 110. The hall sensor 110 is configured to detect a position of an imager on an X axis and a Y axis, and since the level of the detection signal from the hall sensor 110 is low, it may be necessary to amplify the level of the detection signal to an extent that signal processing can be performed.

However, the detection signal may include an offset generated by a device to which the hall sensor device or an optical image stabilization device is applied, or generated by a gyro sensor. Such an offset may be a direct current (DC) offset.

The current supplier 122 is configured to provide a compensation current for canceling the offset included in the detection signal from the hall sensor 110 to the amplifier 121. The compensation current is varied depending on the offset and is provided to a feedback line of the amplifier 121.

The converter 123 is configured to perform an analog-to-digital conversion on an amplified detection signal generated by the amplifier 121 amplifying the detection signal, and output a converted digital signal.

The converted digital signal is used to control the position of the imager.

Figure 2:
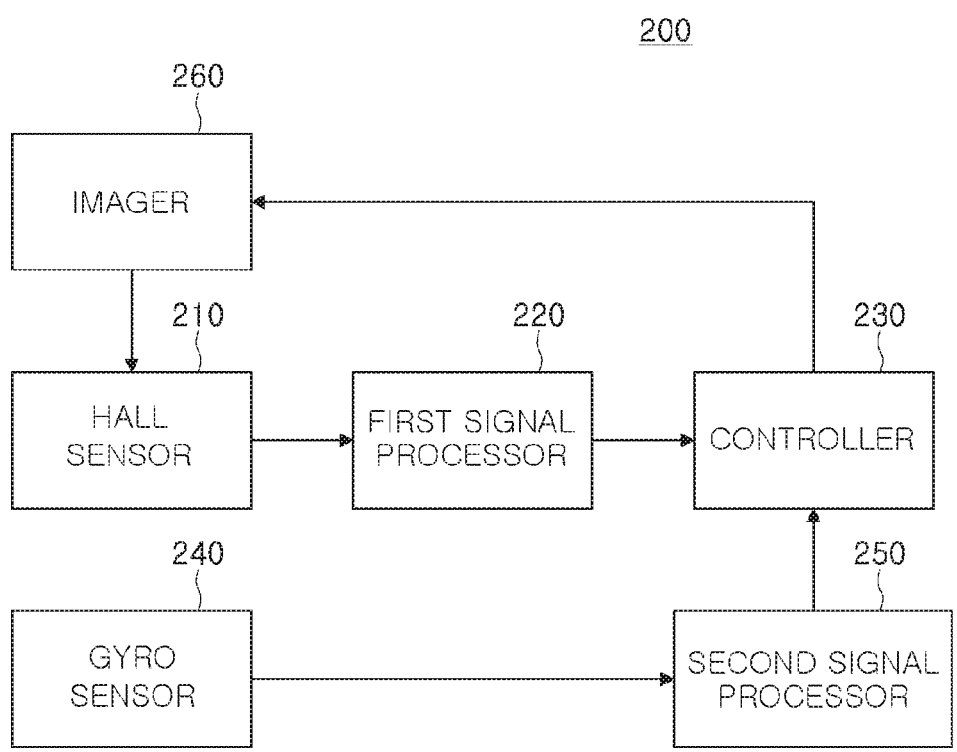
FIG. 2 is a schematic block diagram of an optical image stabilization device according to an example embodiment.

FIG. 2 is a schematic block diagram of an optical image stabilization device 200 according to an example embodiment.

Referring to FIG. 2, the optical image stabilization device 200 includes a first signal processor 220, a second signal processor 250, and a controller 230.

The first signal processor 220 is configured to process a detection signal from a hall sensor 210 to generate an available digital signal, and then transfer the digital signal to the controller 230.

The controller 230 is configured to control the position of an imager 260 on the basis of the digital signal from the first signal processor 220.

The second signal processor 250 is configured to process a detection signal from a gyro sensor 240 to generate an available digital signal, and then transfer the digital signal to the controller 230.

The gyro sensor 240 is configured to detect a motion of a device provided with the optical image stabilization device 200. Likewise, the controller 230 is configured to control an optical path of the imager 260 according to the digital signal of the second signal processor 250.

Figure 3:
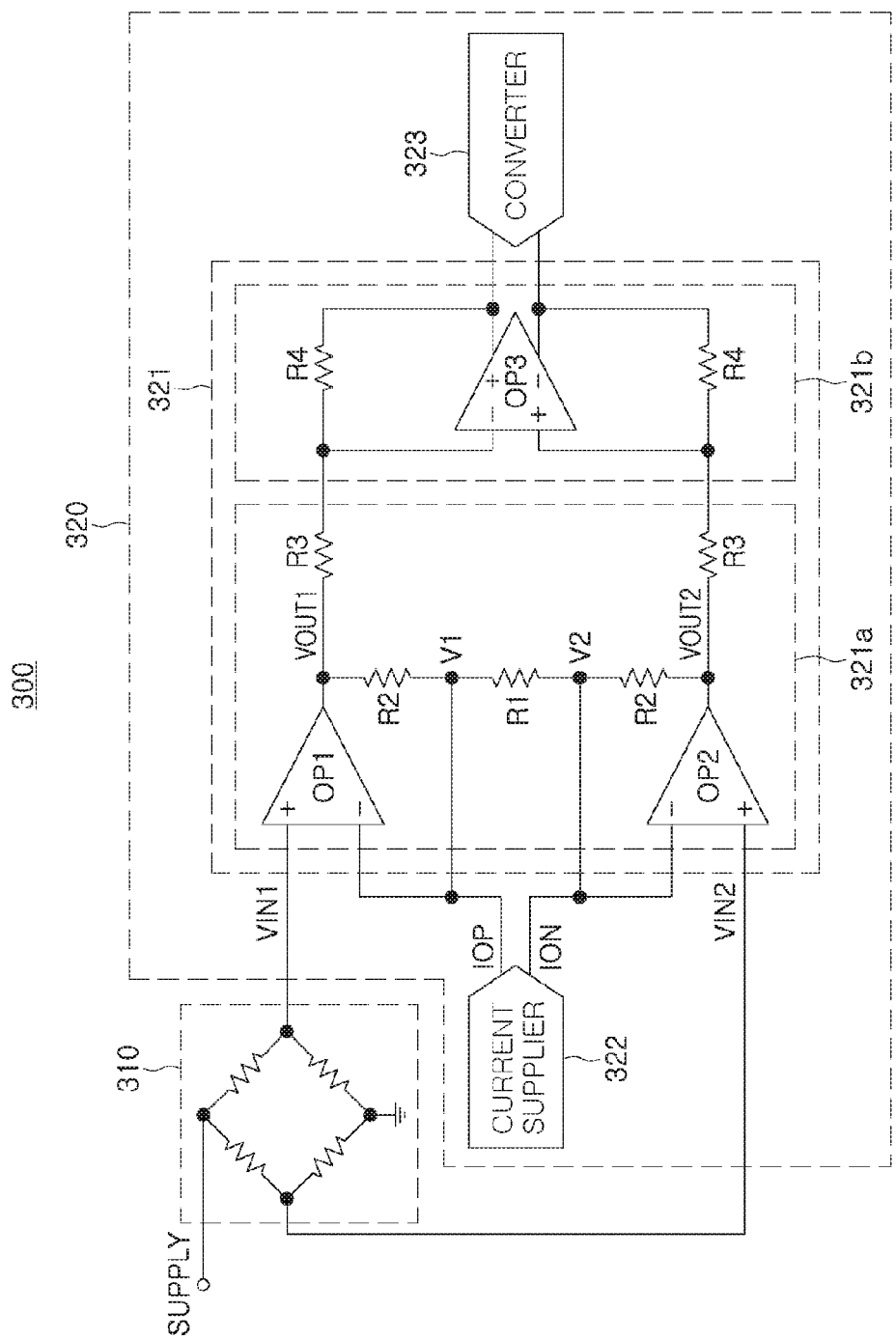
FIG. 3 is a view illustrating a configuration of a hall sensor device in more detail.

FIG. 3 is a view illustrating a configuration of a hall sensor device 300 in more detail. The hall sensor device 300 includes a first signal processor 320 configured to perform signal processing on a detection signal from a hall sensor 310.

Referring to FIG. 3, an amplifier 321 of the first signal processor 320 includes a differential amplifier 321a and a buffer 321b. An equivalent circuit of the hall sensor 310 is represented by a bridge resistor.

The differential amplifier 321a includes first and second amplifiers OP1 and OP2, respectively.

The buffer 321b includes a third amplifier OP3, and is configured to buffer a differentially amplified signal of the differential amplifier 321a and transfer the buffered signal to a converter 323.

A positive (+) terminal of the first amplifier OP1 is configured to receive a first detection signal VIN1 from the hall sensor 310, and a negative (−) terminal of the first amplifier OP1 is configured to receive an amplified detection signal VOUT1 through a feedback line.

An amplification ratio of the first amplifier OP1 is set depending on a resistance ratio of resistors R1 and R2 of the feedback line.

A positive (+) terminal of the second amplifier OP2 is configured to receive a second detection signal VIN2 from the hall sensor 310, and a negative (−) terminal of the second amplifier OP2 is configured to receive an amplified detection signal VOUT2 through a feedback line.

Similarly, an amplification ratio of the second amplifier OP2 is set depending on a resistance ratio of resistors R1 and R2 of the feedback line.

The current supplier 322 is configured to provide a first compensation current IOP and a second compensation current ION to the feedback lines of the first amplifier OP1 and the second amplifier OP2, respectively, according to a difference in voltage levels (offset) between the first detection signal VIN1 and the second detection signal VIN2.

An output signal VOUT1 of the first amplifier OP1 is accordingly represented by the following Equation 1:

$$VOUT1 = VIN1 - R2(((V1-V2)/R1) + I_{DAC}) \quad \text{(Equation 1)}$$

In Equation 1, $I_{DAC}$ is the first compensation current IOP of the current supplier 322.

Similarly, an output signal VOUT2 of the second amplifier OP2 may be represented by the following Equation 2:

$$VOUT2 = VIN2 - R2(((V2-V1)/R1) + I_{DAC}) \quad \text{(Equation 2)}$$

In Equation 2, $I_{DAC}$ is the second compensation current ION of the current supplier 322.

As represented in Equation 1 and Equation 2, the difference in voltage levels (offset) between the first detection signal VIN1 and the second detection signal VIN2 may be canceled by the first and second compensation currents IOP and ION.

Since an offset cancellation range of the offset described above is defined according to a selection ratio of the resistor and the compensation current of the feedback line of each amplifier, a wide cancellation range may be guaranteed.

In addition, in a case in which a level of the offset is '0' or is very low, since a level of the compensation current provided from the current supplier 322 is also very low, an influence of noise generated by the current supplier 322 may also be reduced.

For example, in a case in which the difference in voltage levels (offset) of the first detection signal VIN1 and the second detection signal VIN2 is 60 mV, if R1 is set to a resistance value of 2 Kohm and R2 is set to a resistance value of 100 Kohm in order to set the amplification ratio of the first and second amplifiers OP1 and OP2 to 100 times, a compensation current for canceling the offset may be set to ±30 µA by the following Equation 3 to cancel the offset:

$$0 = \left(\frac{R_2}{R_1}\right)\Delta\text{offset} \pm I_{DAC}R_2 \quad \text{(Equation 3)}$$

In Equation 3, $I_{DAC}$ is the first or second compensation current IOP or ION. That is, $+I_{DAC}$ may be the first compensation current IOP and $-I_{DAC}$ may be the second compensation current ION. Conversely, $+I_{DAC}$ may be the second compensation current ION and $-I_{DAC}$ may be the first compensation current IOP.

The symbols + and − above show the compensation current is a sinking current or a sourcing current. That is, the compensation current is the addition or subtraction of a current with respect to the feedback line of the corresponding amplifier.

Figure 4:
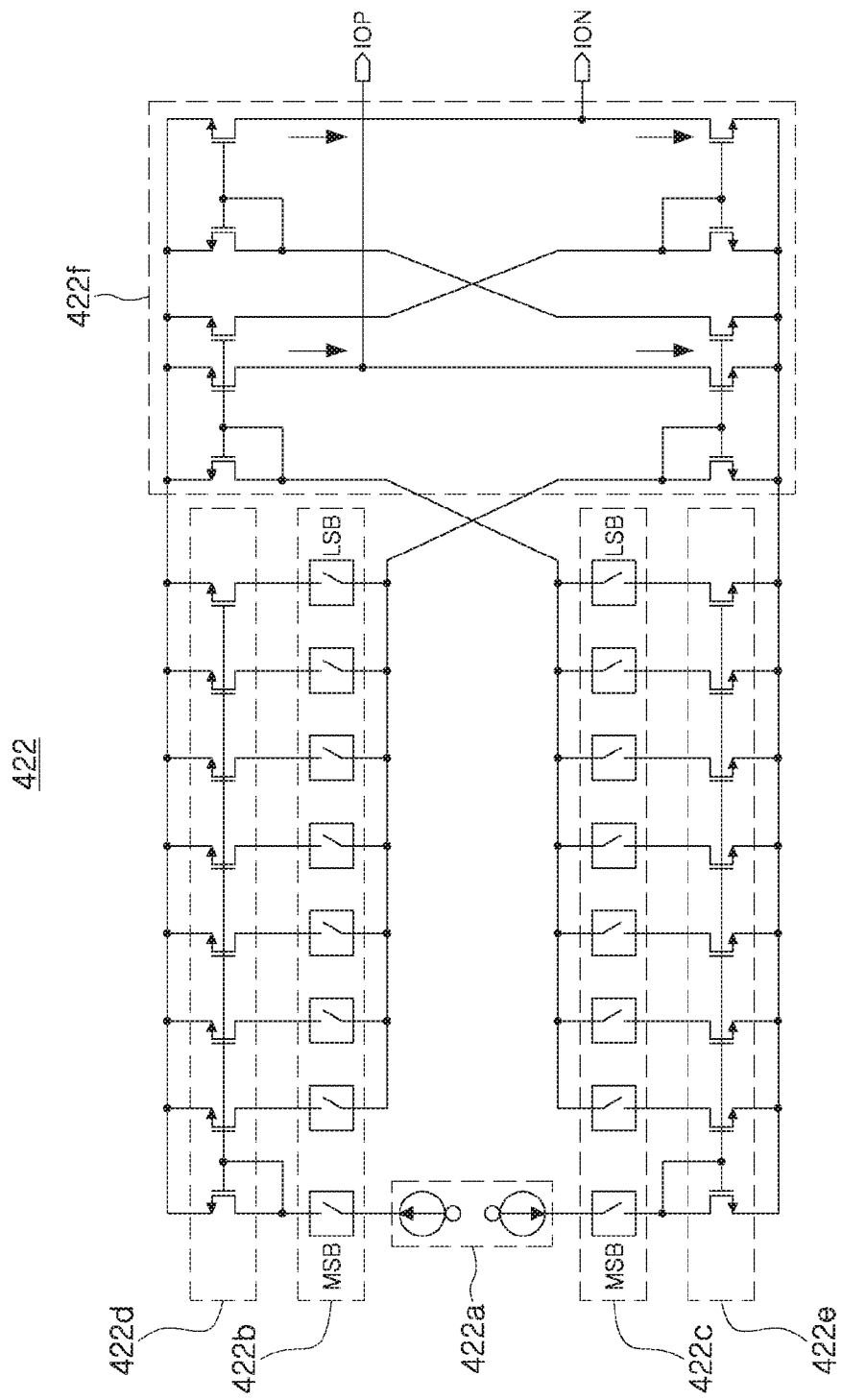
FIG. 4 is a schematic circuit diagram of a current supplier adopted in a hall sensor device according to an example embodiment.

FIG. 4 is a schematic circuit diagram of a current supplier 422 adopted in a hall sensor device (e.g., hall sensor device 300) according to an example embodiment.

Referring to FIG. 4, a current supplier 422 includes a current source 422a, first and second switch groups 422b and 422c, first and second transistor groups 422d and 422e, and a current mirror 422f.

The current supplier 422 is configured to provide the first compensation current IOP and the second compensation current ION, wherein the first compensation current IOP and the second compensation current ION have a compensation relationship with each other.

For example, if the first compensation current IOP is increased, the second compensation current ION is decreased. Conversely, if the first compensation current IOP is decreased, the second compensation current ION is increased.

Figures 5, 6:
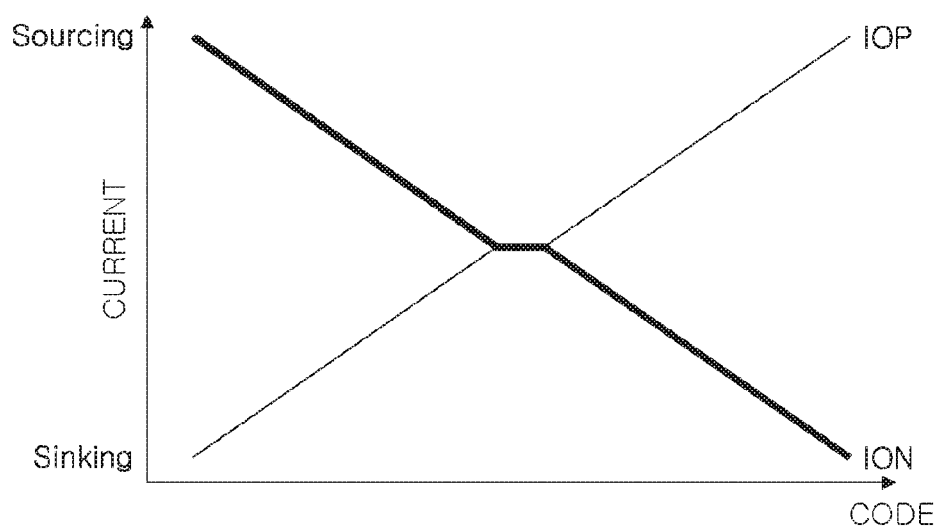
FIG. 5 is a graph of an output current of the current supplier adopted in a hall sensor according to an example embodiment.
FIG. 6 is a table illustrating a comparison of electrical characteristics of a hall sensor device of the related art and a hall sensor device according to an example embodiment.

FIG. 5 is a graph of an output current of the current supplier 422 adopted in a hall sensor device (e.g., hall sensor device 300).

As illustrated in FIG. 5, the first compensation current IOP and the second compensation current ION have a compensation relationship.

Referring to FIG. 4, the current source 422a is configured to provide a sinking current and a sourcing current having opposite arrow directions as illustrated in FIG. 4.

Each of the first switch group 422b and the second switch group 422c includes a plurality of switches, and the plurality of switches in each of the first switch group 422b and the second switch group 422c provide a transfer path of the sinking current or the sourcing current from the current source 422a.

For example, the current supplier 422 is configured to set the compensation current in a digital scheme according to the difference in voltage levels (offset) of the first detection signal VIN1 and the second detection signal VIN2.

As illustrated in FIG. 4, in a case in which the compensation current is set to have resolution of 8 bits, each of the first switch group 422b and the second switch group 422c includes a first switch MSB configured to determine a current direction of the compensation current, and the remaining switches LSB are configured to determine a level of the compensation current.

For example, in a case in which the first switch MSB of the first switch group 422b is turned on and the first switch MSB of the second switch group 422c is turned off in order to supply the sourcing current of the current source 422a and block the sinking current of the current source 422a: the level of the current is determined by the remaining switches LSB among the plurality of switches of the first switch group 422b; transistors of the first transistor group 422d mirror and amplify the current by the corresponding transistor connected to a switch which is switched on; and the current mirror 422f sets the first compensation current IOP to the sinking current and sets the second compensation current ION to the sourcing current.

Similarly, in order to supply the sinking current of the current source 422a and block the sourcing current of the current source 422a, the operations described above are set in reverse, and thus: transistors of the second transistor group 422e mirror and amplify the current by the corresponding transistor connected to a switch which is switched on; and the current mirror 422f sets the first compensation current IOP to the sourcing current and sets the second compensation current ION to the sinking current.

FIG. 6 is a table illustrating a comparison of electrical characteristics of a hall sensor device according to the related art and the hall sensor device 300 according to an example embodiment.

As illustrated in FIG. 6, according to the related art in which the offset is canceled according to an amplification ratio of the amplifier, since the offset cancellation range is narrow and a separate control voltage is required, an influence of noise may be high when the offset is canceled. On the other hand, according to the example embodiment disclosed herein, since the offset cancellation range is wide due to canceling the offset according to amplitude of the compensation current and a resistance value of the amplifier, and the compensation current may be low or may be '0', in a case in which the offset is low or is '0', the influence of noise may be low when the offset is canceled.

As set forth above, according to the example embodiments disclosed herein, the DC offset included in the output signal of the hall sensor may be canceled and the DC offset of a wide frequency range may be canceled at low noise.

The apparatuses, units, modules, devices, and other components (e.g., the hall sensor 110/210, amplifier 121, current supplier 122, converter 123, first signal processor 220, controller 230, gyro sensor 240, second signal processor 250 and imager 260) illustrated in FIGS. 1-4 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-4. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described herein with respect to FIGS. 1-4 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A hall sensor device comprising:
an amplifier configured to amplify a detection signal of a hall sensor; and
a current supplier configured to provide a compensation current to a feedback line of the amplifier according to an offset of the detection signal, to cancel the offset,
wherein:
the amplifier comprises a first amplifier configured to amplify a first detection signal from the hall sensor and a second amplifier configured to amplify a second detection signal from the hall sensor,
each of the first and second amplifiers is configured to receive the compensation current from the current supplier through the feedback line, and
the current supplier includes:
a current source;
a first switch group comprising first switches configured to provide a first current transfer path from the current source;
a first transistor group comprising first transistors connected to the first switches, respectively, each of the first transistors being configured to amplify a current from a corresponding switch among the first switches;
a second switch group comprising second switches providing a second current transfer path from the current source;
a second transistor group comprising second transistors connected to the second switches, respectively, each of the second transistors being configured to amplify a current from a corresponding switch among the second switches; and
a current mirror configured to mirror the amplified currents from the first transistor group and the second transistor group to output a first compensation current and a second compensation current.

2. The hall sensor device of claim 1, further comprising a buffer configured to buffer output signals of the first and second amplifiers.

3. The hall sensor of claim 1, wherein:
the feedback line comprises a first feedback line to the first amplifier and a second feedback line to the second amplifier; and
the current supplier is configured to provide the compensation current to the first feedback line and the second feedback line, respectively, according to a difference in voltage levels between the first detection signal and the second detection signal.

4. The hall sensor of claim 1, wherein the first compensation current and the second compensation current have a compensation relationship.

5. The hall sensor of claim 1, wherein:
the feedback line comprises a first feedback line to the first amplifier and a second feedback line to the second amplifier;
the first compensation current is applied to the first feedback line; and
the second compensation current is applied to the second feedback line.

6. The hall sensor of claim 1, wherein amplification ratios of the first amplifier and the second amplifier are set depending on resistance ratios of resistors of the first and second feedback lines.

7. An optical image stabilization device comprising:
a first signal processor configured to cancel an offset included in a detection signal from a hall sensor by providing a compensation current to a feedback line of an amplifier; and
a controller configured to control a position of an imager according to a signal processing result of the first signal processor,
wherein the first signal processors comprises:
an amplifier comprising a first amplifier configured to amplify a first detection signal from the hall sensor and a second amplifier configured to amplify a second detection signal from the hall sensor; and
a current supplier configured to apply a first compensation current to a feedback line of the first amplifier and a ply a second compensation current to a feedback line of the second amplifier,
wherein each of the first and second amplifiers comprises:
a differential amplifier configured to receive the compensation current of the current supplier according to a difference in voltage levels between the first detection signal and the second detection signal through the feedback line, and
a buffer configured to buffer output signals of the first and second amplifiers; and
the current supplier comprises:
a current source:
a first switch group comprising first switches configured to provide a first current transfer path from the current source;
a first transistor group comprising first transistor connected to the first switches, respectively, each of the first transistors being configured to amplify a current from a corresponding switch among the first switches;
a second switch group comprising second switches configured to provide a second current transfer path from the current source;
a second transistor group comprising second transistor connected to the second switches, respectively, each of the second transistors being configured to amplify a current from a corresponding switch among the second switches; and
a current mirror configured to mirror the amplified currents from the first transistor group and the second transistor group to the output for the first compensation current and the second compensation current.

8. The optical image stabilization device of claim 7, wherein the first compensation current and the second compensation current have a compensation relationship.

9. The optical image stabilization device of claim 7, wherein amplification ratios of the first amplifier and the second amplifier are set depending on resistance ratios of resistors of the feedback line of the first amplifier and the feedback line of the second amplifier.

10. A hall sensor device comprising:
an amplifier configured to
receive a detection signal based on inputs from a hall sensor,
compensate an offset between the inputs with a compensation current based on the offset, and
amplify a compensated detection signal; and
a compensation current supplier configured to supply mirrored compensation currents to the amplifier according to the offset, wherein:
the compensation current supplier comprises:
- a first group of circuits providing a first compensation current, and a second group of circuits providing a second compensation current, each circuit of the first and the second groups of circuits comprising a switch to provide a current from a current source, and a transistor to amplify the current from the switch, wherein the switches are controlled according to the offset, and
- a current mirror configured to mirror the first compensation current and the second compensation current and output the mirrored compensation currents.

* * * * *